Oct. 24, 1961  A. R. HALLER  3,005,261
DENTAL APPARATUS
Filed July 29, 1957
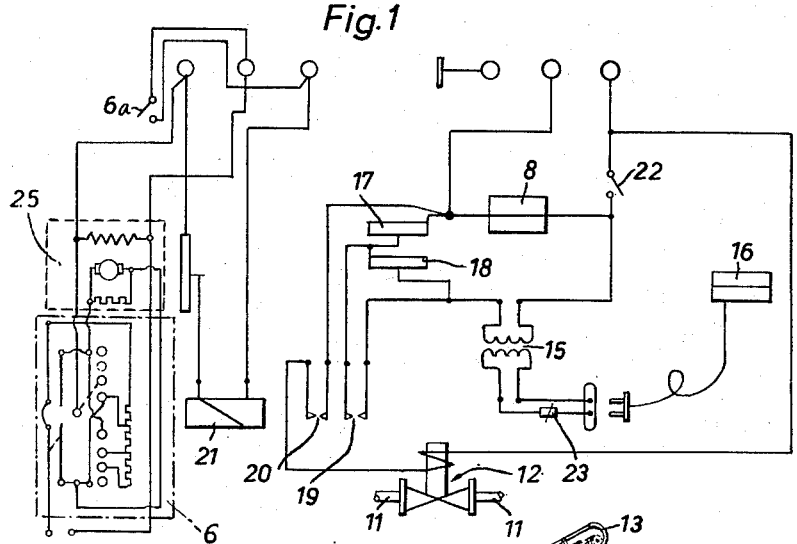
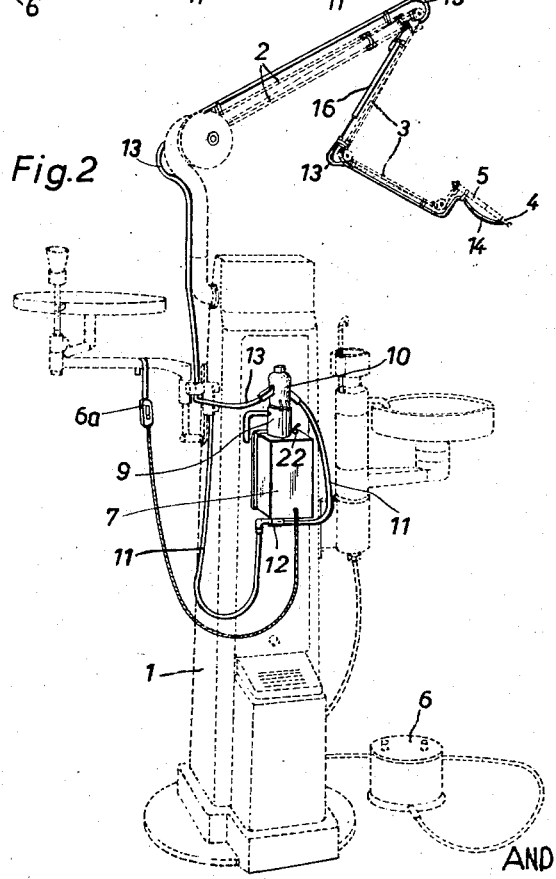
INVENTOR:
ANDRÉ R. HALLER
By Wenderoth, Lind & Ponack
Attys

United States Patent Office 3,005,261
Patented Oct. 24, 1961

3,005,261
DENTAL APPARATUS
André Richard Haller, Uitikon-Waldegg, Switzerland, assignor to A. Koelliker & Cie A.-G., Zurich, Switzerland
Filed July 29, 1957, Ser. No. 674,895
Claims priority, application Switzerland July 31, 1956
3 Claims. (Cl. 32—28)

The present invention relates to dental apparatus, and more particularly to a dental engine having a device for supplying liquid to the tool-carrying holder, which is provided with a liquid container connected through a valve with a pressure gas conduit, and by means of a supply duct with a spray nozzle on the tool holder. The supply of liquid, usually water, as is known, serves for the purpose of simultaneously cooling the tool and washing away the drilling and grinding wastes accumulating during the treatment of a tooth. The temperature of the supplied liquid should approximately correspond to the temperature of the human body. For this reason, it is conventional practice to have a liquid container provided with a heating device. Usually the container is in the form of a bottle, which represents an accessory to the apparatus and is lodged in a receptacle, wherein the heating device is accommodated. A disadvantage of this known type of apparatus consists in that the heating device necessarily is disposed comparatively remote of the spray nozzle provided on the tool holder, so that the water contained and heated in the bottle will undergo substantial cooling on its long travel to the spray nozzle. Moreover, since in most cases no pure liquid but a mixture of pressure gas and liquid (usually a mixture of air and water) is used for cooling and washing, an additional cooling of the water contained in the mixture will result from the not-preheated pressure gas on its long way to the spray nozzle. It was therefore necessary to provide the container with a heating device of relatively great heating capacity, in order to compensate for the losses occurring up to the point of consumption of the liquid. With this arrangement, however, the desired temperature can be maintained on the spray nozzle only after a certain period of operation has elapsed, since upon starting the apparatus, the unheated amount of liquid present in the supply conduit between container and spray nozzle is first sprayed in cold condition, which usually is extremely disagreeable for the patient.

It is an object of the invention to provide a dental treatment apparatus of the type described in which the above drawbacks are avoided.

According to the invention the dental treatment apparatus comprises a second electric heating device which is arranged in a section of the supply conduit situated closer to the tool holder and provided with an adjustable heating capacity adapted to be set to a first and to a second value, the two heating devices being included in a circuit which can operate independently of the working current circuit of the tool drive of the dental engine, and a relay which may be actuated by closing the driving circuit of the tool and which is adapted to switch the second heating device from the lower to the higher heating capacity and to simultaneously open the valve controlling the delivery of pressure gas to the liquid container.

During the working hours of the dentist the two heating devices normally remain in switched-in condition with the second heating device adjusted for low heating capacity. The first heating device associated with the container holds the liquid within said container continuously warm, suitably at a temperature of about 80° C., while the second heating device, which surrounds the supply conduit for a length as great as possible and is disposed preferably as close as possible to the spray nozzle, prevents the amount of water present ahead of the spray nozzle from cooling completely.

The invention will now be particularly described by way of example with reference to the accompanying drawings, in which:

FIGURE 1 is a circuit diagram showing the electrical connections of the elements of the apparatus which are necessary for understanding the invention, and FIGURE 2 is a perspective view of an embodiment of the invention.

In the drawing the numeral 1 represents the standard and 2 the cantilever arm of a dental engine of conventional design. Attached to the cantilever 2 is in a manner known per se a two-section hinge arm 3, to which in turn the instrument holder 5 is linked carrying the instrument 4. This latter is driven by means of a string drive, passed over the cantilever 2 and the arm 3, from an electromotor of the engine. For starting and stopping the electromotor a foot switch 6 is provided which is to be operated by the dentist and is connected in the working circuit of the electromotor (left-hand side in FIGURE 1).

A switch box 7 is secured to the rear side of the machine standard 1 visible in FIGURE 2. Mounted within the switch box 7 is a receptacle, not shown, which is provided with a first heating device 8 (FIG. 1). A bottle 9 provided with a handle is inserted into said receptacle which is accessible from the top side of the switch box. The bottle 9 carries a valve head 10 which is releasably secured to the bottle 9 by means of a clamping fixture, for example by the intermediary of an O-ring packing. From a compressed air connection provided in the machine standard 1 a hose conduit 11 extends to the mixing valve arranged within the valve head 10 and not shown in detail. The conduit 11 contains a solenoid valve 12. A hose conduit 13 is connected to the outlet of the mixing valve arranged in the valve head 10. The hose conduit 13 passes over the cantilever 2 and the hinge arm 3 to the instrument holder 5 and carries at its end a spray nozzle 14. The nozzle opening is situated in immediate proximity to the operating end of the instrument 4.

The circuit with the heating device 8 connected in parallel, contains a transformer 15 to the secondary winding of which a second heating device 16 is connected. Between the heating device 8 and the transformer 15 the said circuit includes two series resistances 17 and 18, of which the resistance 18 can be shunted by a normally open pair of contacts 19 (FIGURE 1). The elements 15, 17, 18 and 19 together with a fuse 23 located in the secondary portion of the transformer 15 are accommodated in the switch box 7. The said second heating device 16 is arranged on the part of the conduit 13 passing over the hinge arm 3, in the example shown on the member of the hinge arm 3 which is remote of the tool holder 5, so that the heating device 16 is located on a section of the conduit 13 between the bottle 9 and the spray nozzle 14, which is close to the instrument holder 5.

The solenoid valve 12 is operable by a circuit which includes a normally open pair of contacts 20. The two pairs of contacts 19 and 20 may be actuated by means of a relay 21 which is associated with the operating circuit of the driving motor of the instrument 4 of the dental machine. In addition to the foot switch 6 a hand operated switch 6a is provided which permits to open or close the supply of liquid to the nozzle 14, independently of the foot switch 6. The manually operated switch 6a situated in the relay circuit (parallel-field circuit) of the dental engine permits of stopping the operation of the device for the delivery of liquid, i.e. of closing the solenoid valve 12, whereby the supply of air is interrupted. The toggle switch 22 permits to switch off the heating device 8 and to open the transformer circuit for the heating device 16.

The mode of operation of the described dental engine is as follows: Assuming the bottle 10 is filled, the circuit of the heating devices 8 and 16 is closed with the contacts 19 and 20 open, the hand switch 6a is switched-in, and the foot switch 6 is open. This constitutes the normal condition of the engine during working hours of the dentist. The resistances 17, 18, the heating devices 8 and 16, and the transformer 15 may be proportioned for example as follows: resistance 17: 200 ohms, resistance 18: 1500 ohms (both having adjustable take-off), heating device 8: 220 v., 8 w. constant output, heating device 16: 7 w. (10 v.) during periods of rest and 28 w. (20 v.) output at normal operation, with a transformer ratio of 220:20. In the said normal condition the output of the heating device 8 is 8 watts, whereby the liquid contained in the bottle will be heated up to about 80° C., and the output of the heating device 16 is 7 watts, whereby the conduit 13 and the liquid contained therein are kept at body temperature. In order to operate the dental instrument, the circuit of the driving motor of the instrument 4 is closed by actuating the switch 6. The instrument 4, for example a drill, is rotated by means of the string drive. At the same time a difference in potential is generated in the parallel-field circuit and the relay 21 responds. Accordingly it is possible, when the instrument remains in operation, to control the relay 21 by means of the hand switch 6a. The relay 21 subsequently closes the two pairs of contacts 19 and 20. With closed contacts 20, the solenoid valve 12 in the conduit 11 is energized and thus opens. Consequently pressure gas enters the valve head 10, and becomes mixed with the liquid pressed out of the bottle 9 according to the adjustment of the mixing valve in the valve head, and the mixture of gas and liquid is sprayed or atomized through the nozzle 14. Simultaneously, as already mentioned, the contacts 19 have also been closed by the relay 21. This results in shunting of the higher resistance 18 so that the heating device 16 is now switched over from the smaller to the greater heating capacity. The liquid, which is contained in the conduit 13 during the inoperative condition of the dental engine and which is permanently kept in a heated state by the heating device 16 particularly in the half of the conduit 13 adjacent to the tool holder 5, is discharged through the nozzle 14 for a short period of time at the beginning of the flow of liquid. The first jet of liquid emerging from the nozzle thus is not cold. However, as soon as the liquid column present in the conduit 13 once is in motion, the heating device 16, as mentioned is changed-over for greater heating capacity and now insures permanently a preheating of the liquid issuing from the nozzle 14, since the heat losses occurring during the travel of the liquid from the bottle 9 to the nozzle 14 are compensated by said heating device to such an extent that the issuing jet approximately has body temperature. Tests have proved that in this manner a jet temperature falling within the desired limits of 37° to 44° C. may be maintained during the entire spray period.

As soon as the driving motor of the tool 4 is shut off, the energisation of the solenoid valve 12 ceases, the feed of pressure gas and thus the supply of liquid is interruped, the contacts 19 and 20 are opened and the heating device 16 is again switched back to low heating capacity.

I claim:

1. In a dental apparatus having an instrument carrying holder, driving means for the instrument mounted on the holder and an electric motor connected to said driving means, a liquid container, a spray nozzle on the holder, and a feed line connected between the liquid container and the spray nozzle for supplying liquid to the spray nozzle, the combination of electrical control means connected to said electric motor for controlling the supply of electricity to the electric motor for the driving means, a pressure gas feed line connected to the container, a relay operated valve means in the pressure gas feed line for controlling the supply of pressure gas to the container, a first electric heating device of constant heating capacity in heat transfer association with the liquid container, a second electric heating device in heat transfer association with the feed line leading to the spray nozzle at a section of the feed line situated closer to the instrument carrying holder than to the container, an electric circuit energizable independently of the electrical control means for the instrument, said circuit connecting said heating devices to a source of power, relay operated means in said circuit for adjusting the heating capacity of said second heating device from a first to a second value, and a relay means in said circuit connected to said relay operated means and said relay operated valve means, said relay means having energizing means connected to said electrical control means and energized by current flow in the electric control means for actuating said relay means and said relay operated means for changing over the heating capacity of the second heating device from a lower to a higher value and for simultaneously actuating said relay operated valve means to open said valve means to supply pressure gas to said liquid container.

2. The combination as claimed in claim 1 in which said means for adjusting the heating capacity of said second electric heating device comprises a transformer included in said circuit between the first and the second heating device for reducing the operating voltage of the second heating device.

3. The combination as claimed in claim 1 in which said valve means controlling the supply of pressure gas comprises a solenoid operated valve energized by said circuit and said relay comprises two pairs of contacts, and a solenoid energized by the current in said electric control means, a resistance across which one pair of contacts is connected for shunting the resistance in the circuit of said heating devices, and the other pair of contacts being connected to the solenoid for said valve for producing energization of the valve solenoid and effecting opening of said valve when said contacts are closed.

References Cited in the file of this patent

UNITED STATES PATENTS 2,420,338     Page _____ May 13, 1947